United States Patent
Mansour et al.

(10) Patent No.: US 8,660,507 B1
(45) Date of Patent: Feb. 25, 2014

(54) DIVERSITY SIGNAL RECEPTION

(75) Inventors: Nagi A. Mansour, Arlington, VA (US); Kafi I. Hassan, Fairfax, VA (US); Nawara Omary, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/551,380

(22) Filed: Jul. 17, 2012

(51) Int. Cl.
 *H04B 7/00* (2006.01)

(52) U.S. Cl.
 USPC .................. 455/135; 455/137; 455/277.2

(58) Field of Classification Search
 USPC ........... 455/562.1, 133, 134, 135, 137, 277.1, 455/277.2
 See application file for complete search history.

(56) References Cited

U.S. PATENT DOCUMENTS

| | | | |
|---|---|---|---|
| 5,335,010 A * | 8/1994 | Lindemeier et al. | 455/277.1 |
| 5,848,361 A * | 12/1998 | Edwards | 455/562.1 |
| 6,577,353 B1 * | 6/2003 | Welles et al. | 455/134 |
| 8,270,919 B2 * | 9/2012 | Yoshino et al. | 455/133 |

* cited by examiner

*Primary Examiner* — Thanh Le

(57) ABSTRACT

A signal is received at a plurality of antennas of a wireless device, and a signal strength indicator is calculated for the signal received at each of the plurality of antennas. From the plurality of antennas, a subset of antennas associated with the highest signal strength indicators are selected, and maximum ratio combining is performed on the signals received by the selected subset of antennas.

16 Claims, 5 Drawing Sheets

|  | A1 | A2 | A3 | A4 | R1<br>MRC All<br>Antennas | R2<br>Selection<br>and MRC |
|---|---|---|---|---|---|---|
| t1 | 10 | 7 | 5 | 2 | 6.94 | 8.75 |
| t2 | 8 | 9 | 10 | 7 | 8.64 | 9.53 |

DIVERSITY SIGNAL RECEPTION

TECHNICAL BACKGROUND

Wireless communication systems are subject to interference and fading phenomena which introduce noise and distortion into signals. One approach to overcoming the effects of fading and interference is the use of diversity reception where more than one antenna is employed at a receiver to increase the probability that a signal of relatively strong amplitude will be received. Signals received at multiple antennas may be combined to mitigate the effects of fading.

One method of combining a signal received at multiple antennas is maximum ratio combining, in which a signal received at each antenna is processed and summed. The use of multiple antennas at the receiver increases the gain of the received signal as well as the amount of data to be processed.

OVERVIEW

In an embodiment, a signal is received at a plurality of antennas of a wireless device, and a signal strength indicator is calculated for the signal received at each of the plurality of antennas. From the plurality of antennas, a subset of antennas associated with the highest signal strength indicators are selected, and maximum ratio combining is performed on the signals received by the selected subset of antennas.

DETAILED DESCRIPTION

Figure 1:
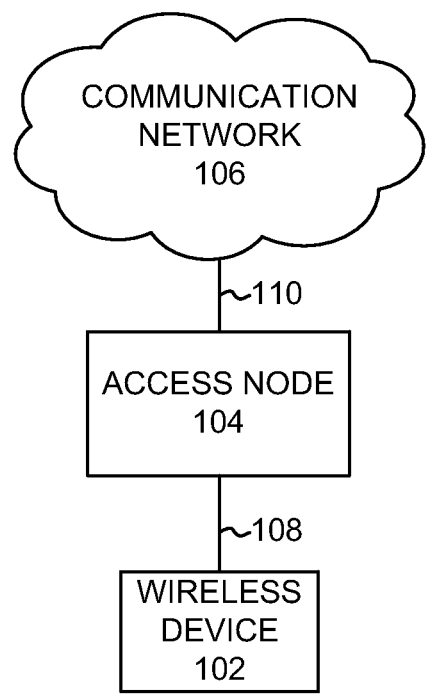
FIG. 1 illustrates an exemplary system for diversity signal reception.

FIG. 1 illustrates an exemplary communication system 100 to process a call request comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 over communication link 108. Wireless device 102 can comprise a plurality of antennas which can receive a signal from access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 through communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In an embodiment, a signal is received at a plurality of antennas of wireless device 102, and a signal strength indicator is calculated for the signal received at each of the plurality of antennas. A subset of antennas of the plurality of antennas which are associated with the highest signal strength indicators is selected. Maximum ratio combining is performed on the signals received by the selected subset of antennas.

Figure 2:
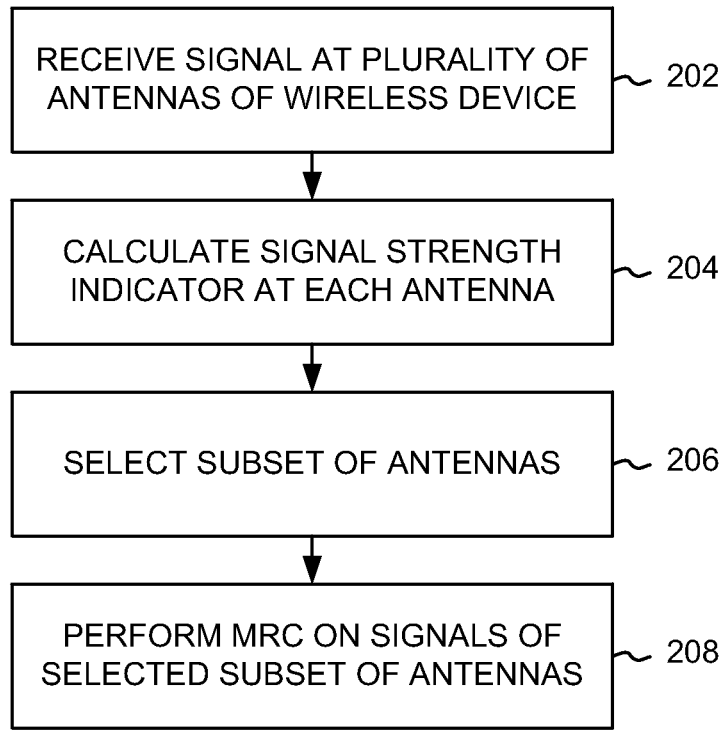
FIG. 2 illustrates an exemplary method of diversity signal reception.

FIG. 2 illustrates an exemplary method of diversity signal reception. In operation 202, a signal is received at a plurality of antennas of a wireless device. For example, wireless device 102 can comprise more than one antenna to receive a signal from, for example, access node 104. One technique used to improve signal reception at a wireless device is to increase the number of antennas at the wireless device, as diversity gain improvement is directly related to the number of receiving antennas.

Figures 3A, 3B:
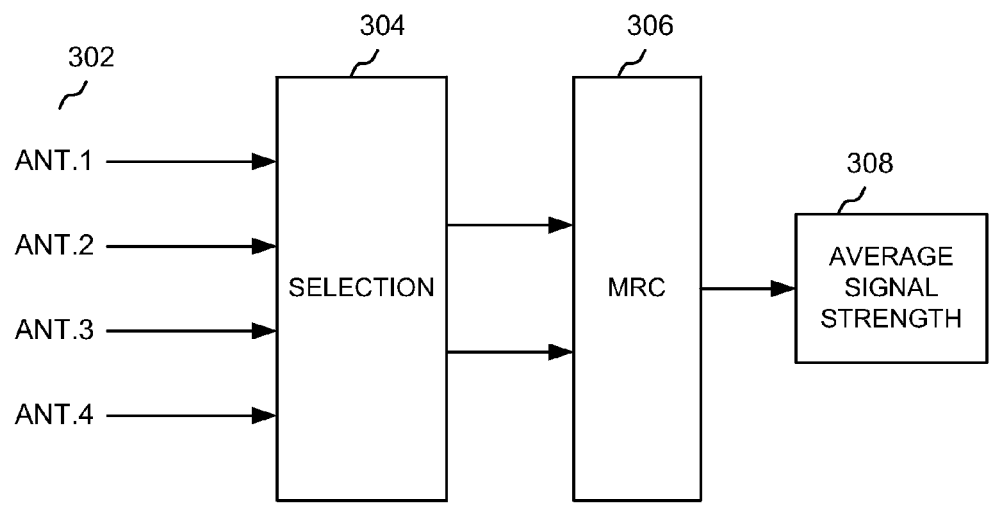
FIG. 3A illustrates exemplary signal strengths indicators and maximum ratio combining results.
FIG. 3B illustrates an exemplary selection of a subset of antennas.

In operation 204, a signal strength indicator is calculated for the signal received at each of the plurality of antennas. The signal strength indicator can be, for example, a received signal strength indicator (RSSI), a received channel power indicator (RCPI), a signal to interference-plus-noise ratio (SINR), or a carrier to interference-plus-noise ratio (CINR). Other indications of signal strength can also be used. As an example, FIG. 3A illustrates a signal strength indicator calculated for four antennas A1-A4 of a wireless device (such as wireless device 102). For illustration purposes only, two signal strength indicators are calculated for each antenna at two different times, t1 and t2. Greater or fewer signal strength indicators can be calculated.

Returning to FIG. 2, based on the calculated signal strength indicators, in operation 206, a subset of antennas is selected from the plurality of antennas associated with the highest signal strength indicators. For example, at time t1 antennas A1 and A2 (FIG. 3A) can be selected since they are associated with the highest signal strength indicators (in FIG. 3A, 10 and 7, respectively). As another example, at time t2 antennas A2 and A3 can be selected, since they are associated with the highest signal strength indicators (9 and 10, respectively, in FIG. 3A).

In operation 208 (FIG. 2), maximum ratio combining is performed on the signals received by the selected subset of antennas. Result column R1 (FIG. 3A) illustrates an exemplary result of performing maximum ratio combining on each signal from all antennas A1-A4, and result column R2 illustrates an exemplary result of performing maximum ratio combining on a signals received by the selected subset of antennas.

The results in column R2 at times t1 and t2 are higher than the results illustrated in column R1 at the same times, illustrating that the selection of a subset of antennas typically results in a greater received gain of the signal. In addition, performing maximum ratio combining on signals received by a subset of antennas of the wireless device reduces the amount of data to be processed, which reduces processor load and decreases drain on a battery or other power source of the wireless device. The results illustrated in column R1 are typical of a conventional approach to maximum ratio combining, which relies on both the addition of antennas to increase gain and the collection and processing of greater amounts of data. The results illustrated in column R2 illustrate that, contrary to the conventional approach, the selection of a subset of antennas typically results in a greater received gain of the signal while reducing a drain on a battery or other power source of the receiving wireless device. In an embodiment, a resultant four-fold decrease in signal processing can be achieved.

Figure 4:
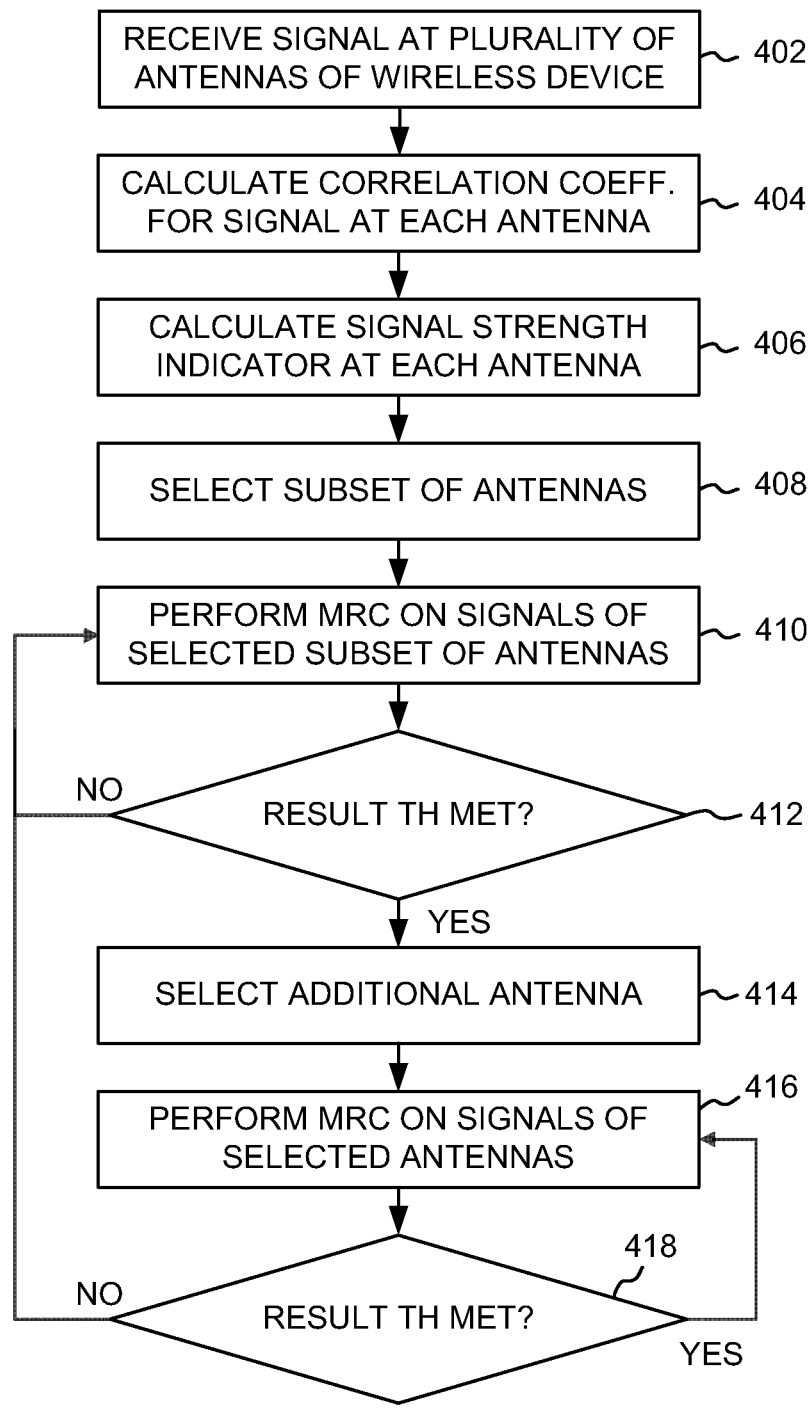
FIG. 4 illustrates another exemplary method of diversity signal reception.

FIG. 4 illustrates another exemplary method of diversity signal reception. In operation 402, a signal is received at a plurality of antennas of a wireless device. For example, wireless device 102 can comprise more than one antenna to receive a signal, for example, from access node 104.

In operation 404, a correlation coefficient is calculated based on the signal received at each of the plurality of antennas. In an embodiment, a correlation coefficient (or several correlation coefficients) can be calculated based on a comparison of pairs of each of the antennas of the wireless device. For example, in a wireless device comprising four antennas A1-A4, a correlation coefficient can be calculated for comparisons of the signal received at antennas A1 and A2, A1 and A3, A1 and A4, A2 and A3, A2 and A4, and A3 and A4. In embodiment, the correlation coefficient can provide an indication of relative spatial diversity between two antennas. In general, a lower correlation corresponds to greater relative diversity. In an embodiment, a correlation coefficient can be calculated for two antennas by dividing a difference in received signal strength by an average signal strength. In an embodiment, a correlation coefficient can be calculated for two antennas by dividing a difference in received signal quality (such as a signal to interference-plus-noise ratio (SINR), or a carrier to interference-plus-noise ratio (CINR)) by an average signal quality. In an embodiment, two correlation coefficients can be calculated for two antennas based on each of the signal strength and the signal quality as described above.

In operation 406, a signal strength indicator is calculated for the signal received at each of the plurality of antennas. The signal strength indicator can be, for example, based on a received signal strength indicator (RSSI), a received channel power indicator (RCPI), a signal to interference-plus-noise ratio (SINR), or a carrier to interference-plus-noise ratio (CINR). In an embodiment, a calculated correlation coefficient can be used to determine the signal strength indicator. The correlation coefficient can be based on signal strength, signal quality, or a combination thereof. IN an embodiment, the signal strength indicator can be based on a received signal strength indicator (RSSI), a received channel power indicator (RCPI), a signal to interference-plus-noise ratio (SINR), or a carrier to interference-plus-noise ratio (CINR), a correlation coefficient based on signal strength, a correlation coefficient based on signal quality, and combinations thereof.

Based on the calculated signal strength indicators, in operation 408, a subset of antennas is selected from the plurality of antennas associated with the highest signal strength indicators. In an embodiment, the antennas associated with the two highest signal strength indicators can be selected.

In operation 410, maximum ratio combining is performed on the signals received by the selected subset of antennas. The result of performing maximum ratio combining on the signals received by the selected subset of antennas will typically be higher than the result of maximum ratio combining on the signals received by all of the antennas of the wireless device.

In operation 412, it can be determined whether the result of maximum ratio combining on the signals received by the selected subset of antennas meets a result threshold. For example, an application requirement of an application running on the wireless device can be determined, and meeting the result threshold may indicate that the resultant signal strength from the maximum ratio combining is insufficient to meet the application requirement. An application requirement can be, for example, a minimum data rate, or a maximum data delay, tolerable by the application. For example, wireless device 102 may be running a voice application (such as Voice over Internet Protocol) or a streaming video or audio application, which requires a minimum data rate (or can tolerate a maximum data delay) to provide a minimum threshold of performance. When the result of maximum ratio combining on the signals received by the selected subset of antennas does not meet a result threshold (operation 412-NO), it can be determined that the application requirement is met, and maximum ratio combining will be performed on the selected subset of antennas.

When the result of maximum ratio combining on the signals received by the selected subset of antennas meets a result threshold (operation 412-YES), it can be determined, for example, that the application requirement is not met. In operation 414, an additional antenna can be selected. The antenna selected in operation 414 is an antenna not selected as part of the selected subset of antennas, and thus is an additional antenna. In operation 416, maximum ratio combining is performed on the signals received by the selected subset of antennas together with the signal received by the additional antenna. In a situation where the addition of one additional antenna does not result in meeting the application requirement, a further additional antenna can be selected, and maximum ratio combining can be performed on the signals received by the selected subset of antennas together with the signals received by all of the additional antennas.

While the result threshold is met (operation 418-YES), maximum ratio combining can be performed on the signals received by the selected subset of antennas together with the signal received by the additional antenna. When the result threshold is no longer met (operation 418-NO), it can be determined that the additional antenna is not needed, and maximum ratio combining can be performed on the originally selected subset of antennas.

Figure 5:
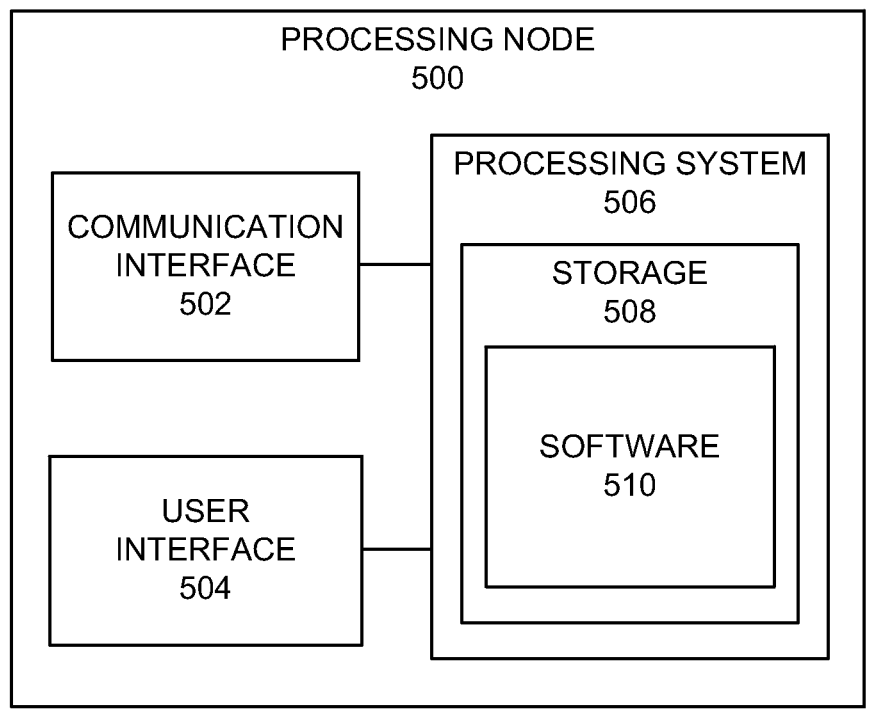
FIG. 5 illustrates an exemplary wireless device.

FIG. 5 illustrates an exemplary wireless device 500 in a communication system. Wireless device 500 comprises communication interface 502, user interface 504, and processing system 506 in communication with communication interface 502 and user interface 504. Wireless device 500 is capable of diversity signal reception. Processing system 506 includes storage 508, which can comprise a disk drive, flash drive, memory circuitry, or other memory device. Storage 508 can store software 510 which is used in the operation of the wireless device 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Wireless device 500 may further include other components such as a power storage unit, a control interface unit, etc., which are omitted for clarity. Communication interface 502 permits wireless device 500 to communicate with a communication system and to receive a signal, and can comprise a plurality of antennas to receive the signal. User interface 504 permits the configuration and control of the operation of wireless device 500. Wireless device 102 is an example of wireless device 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of diversity signal reception, comprising:
   receiving a signal at a plurality of antennas of a wireless device;
   calculating a signal strength indicator for the signal received at each of the plurality of antennas;
   selecting a subset of antennas of the plurality of antennas associated with the highest signal strength indicators;
   performing maximum ratio combining on the signal received by the selected subset of antennas;
   determining that a result of the performed maximum ratio combining meets a result threshold;
   selecting from the plurality of antennas an antenna which is not among the selected subset of antennas based on the determination that the result of the performed maximum ratio combining meets the result threshold; and
   performing maximum ratio combining on the signals received by the selected subset of antennas and the selected antenna.

2. The method of claim 1, further comprising:
   determining a correlation coefficient based on the signal received at each of the plurality of antennas; and
   calculating a signal strength indicator for the signal received at each of the plurality of antennas based on the determined correlation coefficient and the received signal.

3. The method of claim 1, wherein the signal strength indicator is an average signal strength indicator per antenna.

4. The method of claim 1, wherein the signal strength indicator is an average carrier plus interference to noise ratio per antenna.

5. The method of claim 1, wherein the signal strength indicator is an average carrier plus interference to noise ratio plus a gain coefficient per antenna.

6. The method of claim 1, wherein the selected antenna is associated with the highest signal strength indicator of the antennas not among the selected subset of antennas.

7. The method of claim 1, further comprising:
   determining that a result of the performed maximum ratio combining does not meet a result threshold; and
   performing maximum ratio combining only on the signals received by the selected subset of antennas based on the determination that the result of the performed maximum ratio combining does not meet the result threshold.

8. The method of claim 1, wherein the result threshold is based on an application requirement of an application running on the wireless device.

9. A system for diversity signal reception, comprising:
   a communication interface configured to receive a signal at a plurality of antennas; and
   a processing system configured to calculate a signal strength indicator for the signal received at each of the plurality of antennas, select a subset of antennas of the plurality of antennas associated with the highest signal strength indicators, perform maximum ratio combining on the signal received by the selected subset of antennas, determine that a result of the performed maximum ratio combining meets a result threshold, select from the plurality of antennas an antenna which is not among the selected subset of antennas based on the determination that the result of the performed maximum ratio combining meets the result threshold, and perform maximum ratio combining on the signals received by the selected subset of antennas and the selected antenna.

10. The system of claim 9, wherein the processing system is further configured to:
    determine a correlation coefficient based on the signal received at each of the plurality of antennas; and
    calculate a signal strength indicator for the signal received at each of the plurality of antennas based on the determined correlation coefficient and the received signal.

11. The system of claim 9, wherein the signal strength indicator is an average signal strength indicator per antenna.

12. The system of claim 9, wherein the signal strength indicator is an average carrier plus interference to noise ratio per antenna.

13. The system of claim 9, wherein the signal strength indicator is an average carrier plus interference to noise ratio plus a gain coefficient per antenna.

14. The system of claim 9, wherein the selected antenna is associated with the highest signal strength indicator of the antennas not among the selected subset of antennas.

15. The system of claim 9, wherein the processing system is further configured to:
    determine that a result of the performed maximum ratio combining does not meet a result threshold; and
    perform maximum ratio combining only on the signals received by the selected subset of antennas based on the determination that the result of the performed maximum ratio combining does not meet the result threshold.

16. The system of claim 9, wherein the result threshold is based on an application requirement of an application running on the wireless device.

* * * * *